Patented Mar. 23, 1948

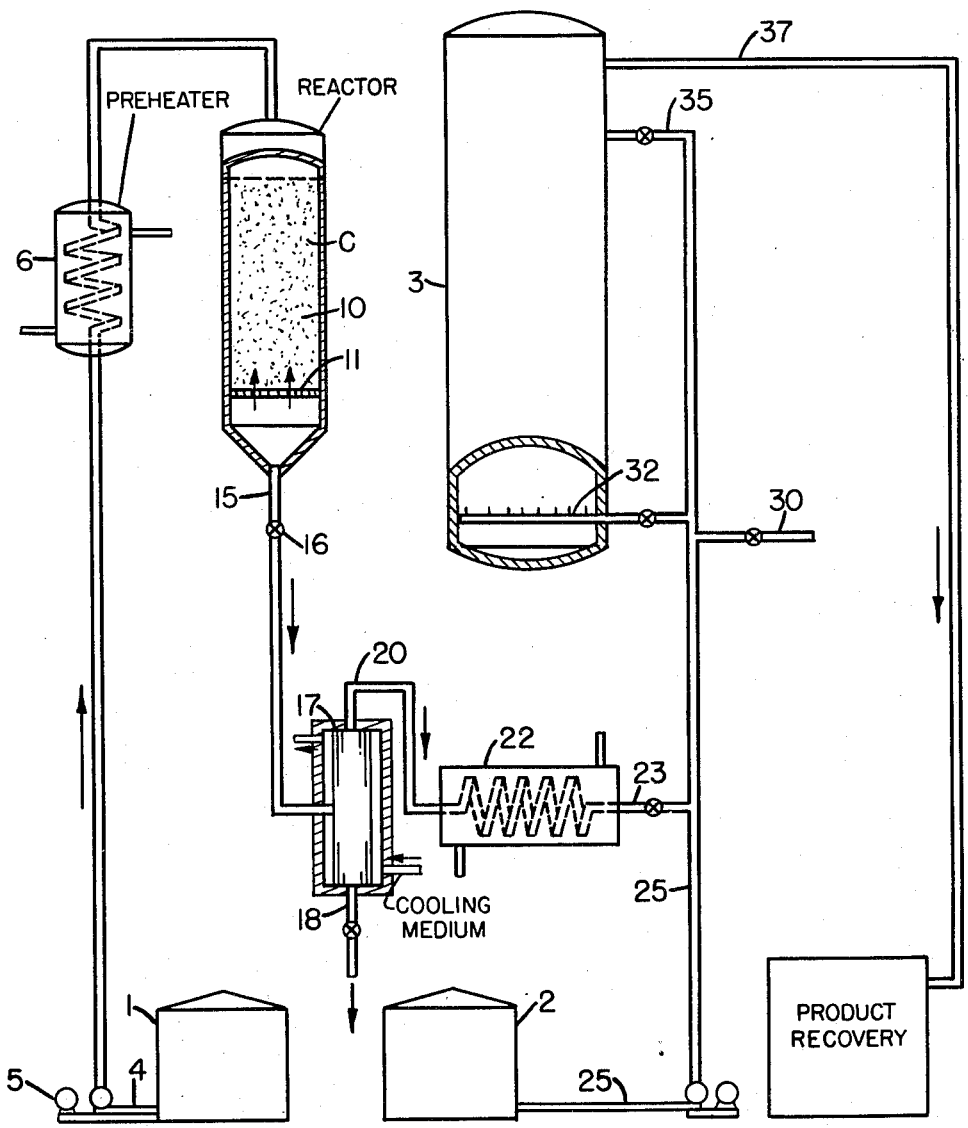

2,438,444

UNITED STATES PATENT OFFICE 2,438,444

METHOD OF REMOVING DIOLEFINS FROM AN OLEFINIC FEED STOCK

Minor C. K. Jones, Mountainside, and Edmond R. Retailliau, Cranford, N. J., assignors to Standard Oil Development Company, a corporation of Delaware Application February 2, 1945, Serial No. 575,818

2 Claims. (Cl. 260—683.4)

1

This invention relates to the novel features hereinafter described in the following specification and claims, reference being had to the accompanying drawing. More particularly, this invention relates to the alkylation of isoparaffins such as isobutane with olefins, in the presence of acid alkylation catalysts, such as sulfuric acid having a strength of 90-98% by weight, in which process we have devised a method for improving the operation by elimination of diolefins.

This is a continuation in part of our copending application, Serial No. 529,456, filed April 4, 1944 and now abandoned.

In the ordinary refinery practice of alkylating isoparaffins with olefins as where isobutane is alkylated by means of butylene, the feed stock in practical operations is never 100% pure. For example, the olefin feed is usually obtained from a normal refinery practice by fractionation and the olefin feed stock has associated therewith isobutane, normal butane, as well as some of the polyolefins. Ordinarily, normal butane, for example, does not cause any particular difficulties in the operation, it merely passes through the system as inert material. On the other hand, the diolefins react with the catalyst, that is, in the case where sulfuric acid is used these diolefins react with it and reduce it in quantity in an amount corresponding to their own percentage of composition in the olefin feed stock. Since even under the best conditions the consumption of sulfuric acid in pounds per gallon of alkylate produced is relatively high, obviously any process which would minimize the losses of sulfuric acid would be beneficial to the operation.

We are aware that prior to our invention it had been proposed by others to pretreat olefin feed stocks with reagents to remove the diolefins but we have devised an operation which is more feasible and less costly than any of which we are aware.

The main object of our invention therefore is to condition, or to pretreat an olefin feed stock to an alkylation operation so as to improve the operation from the standpoint of catalyst consumption.

Other and further objects of our invention will appear from the following description and claims.

2

In the accompanying drawing we have shown diagrammatically an alkylation unit or plan which embodies a preferred modification of our invention.

Referring to the drawing, 1 represents an olefin feed storage tank and 2 represents an isoparaffin storage tank, 3 represents an alkylation reactor into which acid, isoparaffin, olefin are charged to effect the desired conversion as will subsequently appear. Prior to introducing the olefin which, in the modification we have selected to illustrate our invention, is a $C_4$ olefin fraction containing diolefins, we first cause the olefins in tank 1 to be withdrawn through line 4 and then pumped by pump 5 into a preheating means 6 and thereafter into a polymerizing or clay treating zone 10 containing a body of fuller's earth C, such as Attapulgus clay. The clay is disposed on a grid or screen 11 in the treater 10 and is in the physical form of pills, pellets, lumps, granules, or other convenient aggregates, and the $C_4$ fraction passes downwardly therethrough. We maintain a temperature in the reactor 10 of from 600°–850° F., preferably around 800° F. We also prefer to maintain positive pressure within the range of from 25–200 lbs. per square inch, with about 50 lbs. per square inch preferred. Under the conditions which we have given the diolefins undergo polymerization and they may be withdrawn with the unchanged gaseous material through line 15 and discharged into a cooled separation drum 17 from which the liquid polymer may be withdrawn through line 18. Line 15 preferably carries a pressure reducing valve 16 so that the pressure may be reduced to about 30–50 lbs. per square inch gauge pressure in separation drum 17. The olefins substantially depleted of diolefins are then withdrawn from the separation drum 17 through line 20, further cooled in a cooler 22, withdrawn through line 23 and then mixed with isobutane or an isobutane rich gas withdrawn from storage 2 through line 25. This mixture of gas is then mixed with strong sulfuric acid, say 98% strength, injected through line 30 and the mixture then passes into the bottom of alkylation tower 3 through jets 32. From this point on, the alkylation is carried out in conventional manner, that is to say, the jets 32 or other devices for providing intimate mixture in good agitation cause the formation of an emulsion of hydrocarbon and acid which passes upwardly in the zone, and at level 35 an emulsion stream is withdrawn and recycled to line 25. Above 35 an emulsion of acid and hydrocarbon is withdrawn for product recovery through line 37.

It will not be necessary to describe in detail the method of treating the raw alkylate in line 37 to recover finished product, for this is well known and understood by those familiar with the art. Likewise, those familiar with the art will understand that we have omitted numerous heat exchange devices, particularly the cooling device for maintaining the reactants in liquid condition, flow meter, etc., for these details are known to the skilled worker in this field. Thus, it will be readily recognized that the raw product in line 37 is first sent to a quiescent zone where the emulsion is permitted to stratify, the low acid layer is recycled to the reaction zone 3, at least in part, and the upper hydrocarbon layer is washed, neutralized and distilled to recover the alkylate. It will also be understood that our improvements apply to the alkylation of isobutane with olefins other than butylene, such as the amylenes and pentenes, and it applies to the alkylation of isopentane.

In order to show the utility of our invention, we set forth the results in a number of runs which we made, and it will be noted from the data below that temperatures of the order of 800° F., pressures of 50 lbs. per square inch gauge, and feed rates of 1.5 volumes of feed per volume of catalyst per hour result in the removal of 100% of butadiene from a C4 fraction containing butanes, butenes, isobutylene and butadiene, together with C3 and C5+ hydrocarbons.

In the foregoing table, it is explained here that the abbreviations have the following meaning:

(1) V./V./Hr.=volumes of feed per volume of catalyst per hour.

(2) p. s. i. g.=lbs. per square inch gauge pressure.

The foregoing data show therefore that butadiene may be removed from compositions such as a C4 fraction containing the same by passing the mixture in contact with fuller's earth or similar clays, or the like, at temperatures around 800° F., say from 700° F. to 900° F., and slightly elevated pressures. We deem this important in many industrial operations. For instance, suppose it were desired to remove isobutylene from its admixture with other C4 hydrocarbons by means of phenol or cresol solvent extraction, if butadiene were present it would react with the phenolic body and of course convert the phenolic body to an undesired reaction product, and the net result would be a loss of phenolic solvent. Therefore, our invention has applicability in those processes where a material to be solvent extracted contains butadiene or other diolefin, for by removal according to our process, we economize in the amount of solvent required.

What we claim is:

1. The method of removing diolefins from an olefinic feed stock containing mono-olefins and diolefins which comprises contacting the mixture with fuller's earth at a temperature of about 800° F. and under a pressure of from 25 to 50 pounds per square inch gauge in a polymerization zone for a time period in the range from about 11 to 16 seconds, withdrawing the total product from the said polymerization zone, transporting the product to a separation zone and separating the diolefins in the form of liquid polymers from the mixture Table.—*Treatment of C4 hydrocarbons with 30–60 mesh size Attapulgus clay*

| Exp. No. | Temp., °F. | Pressure p. s. i. g. | V./V./Hr. | Contact Time in Polymerizing Zone, Seconds | Composition of Treated C4 Hydrocarbons, Per Cent by Vol. | | | | | | Per Cent Butadiene Removed |
|---|---|---|---|---|---|---|---|---|---|---|---|
| | | | | | C3 | Butanes | N-butenes | Iso-butylene | Butadiene | C5+ | |
| FIRST SERIES WITH FEED STOCK A[1] | | | | | | | | | | | |
| 1 | 400 | 100 | 1.20 | 40 | 0.5 | 38.6 | 42.2 | 15.4 | 2.4 | 0.9 | 33.3 |
| 2 | 400 | 50 | 1.06 | 25 | 0.0 | 37.6 | 37.3 | 20.4 | 3.1 | 1.6 | 13.8 |
| 3 | 400 | 25 | 1.76 | 22 | 0.0 | 37.5 | 37.9 | 19.9 | 3.4 | 1.3 | 5.5 |
| 4 | 800 | 100 | 1.15 | 28 | 1.0 | 40.0 | 33.8 | 15.4 | 0.4 | 9.4 | 88.8 |
| 5 | 800 | 50 | 1.15 | 16 | 0.0 | 39.0 | 39.4 | 19.4 | 0.0 | 2.2 | 100 |
| 6 | 800 | 25 | 1.06 | 11 | 0.0 | 38.8 | 39.1 | 20.5 | 0.0 | 1.6 | 100 |
| 7 | 800 | 25 | 1.44 | 4 | 0.0 | 36.7 | 38.1 | 19.4 | 1.0 | 4.7 | 72.2 |
| SECOND SERIES WITH FEED STOCK OF HIGHER BUTADIENE CONTENT (FEED STOCK B[2]) | | | | | | | | | | | |
| 8 | 400 | 100 | 0.41 | 116 | 0.4 | 39.0 | 38.7 | 16.7 | 2.8 | 2.4 | 49.1 |
| 9 | 400 | 200 | 0.34 | 262 | 0.3 | 37.3 | 36.8 | 13.7 | 1.3 | 10.6 | 76.3 |
| 10 | 400 | 100 | 0.27 | 174 | 0.3 | 33.6 | 36.8 | 17.3 | 3.2 | 8.8 | 41.8 |
| 11 | 400 | 200 | 0.26 | 349 | 0.4 | 35.9 | 37.2 | 14.5 | 2.2 | 9.8 | 60.0 |
| 12 | 400 | 400 | 0.23 | 734 | 0.4 | 37.8 | 37.3 | 12.7 | 2.3 | 9.5 | 58.2 |

[1] Feed Stock A:  Per cent by vol.
   C3 .......................................... 0.5
   Butanes ..................................... 36.4
   N-butenes ................................... 39.4
   Isobutylene ................................. 19.5
   Butadiene ................................... 3.6
   C5+ ......................................... 0.6

[2] Feed Stock B:  Per cent by vol.
   C3 .......................................... 0.5
   Butanes ..................................... 35.9
   N-butenes ................................... 37.9
   Isobutylene ................................. 19.6
   Butadiene ................................... 5.5
   C5+ ......................................... 0.6

We have found that the butadiene may be polymerized and removed from the C4 fraction containing butadiene and isobutylene without causing polymerization of the isobutylene, by treatment with Attapulgus clay at temperatures of from 700°–900° F., and pressures in the polymerization zone of from 25–50 lbs. per square inch gauge.

whereby an olefinic material substantially free of diolefins is obtained.

2. Method of pretreating a butene-olefin feed stock containing butadiene which comprises discharging the butene feed into a polymerizing zone containing fuller's earth, maintaining a temperature of about 800° F. and a pressure of 25 to 50 pounds per square inch gauge in the said polymerization zone, maintaining the time of contact in the range from about 11 to 16 seconds, withdrawing the total product from the polymerizing zone, discharging the said total product into a separation zone, and withdrawing the butadiene as a liquid polymer from the separation zone and the remainder of the C₄ olefin in gasiform state.

MINOR C. K. JONES.
EDMOND R. RETAILLIAU.

REFERENCES CITED

The following references are of record in the file of this patent:

UNITED STATES PATENTS

| Number | Name | Date |
|---|---|---|
| 2,282,505 | Vesterdal | May 12, 1942 |
| 2,344,469 | McAllister et al. | Mar. 14, 1944 |
| 2,383,056 | Goldsby | Aug. 21, 1945 |

FOREIGN PATENTS

| Number | Country | Date |
|---|---|---|
| 437,188 | Great Britain | Oct. 14, 1935 |